(12) United States Patent
Kuntz et al.

(10) Patent No.: US 9,991,774 B2
(45) Date of Patent: Jun. 5, 2018

(54) DC FIELD GRADIENT MOTOR

(71) Applicants: Dennis R. Kuntz, West Quincy & Taylor, MO (US); Jan P. Roos, Burlington, MA (US)

(72) Inventors: Dennis R. Kuntz, West Quincy & Taylor, MO (US); Jan P. Roos, Burlington, MA (US)

( * ) Notice: Subject to any disclaimer, the term of this patent is extended or adjusted under 35 U.S.C. 154(b) by 565 days.

(21) Appl. No.: 14/570,732

(22) Filed: Dec. 15, 2014

(65) Prior Publication Data

US 2015/0214793 A1    Jul. 30, 2015

Related U.S. Application Data

(63) Continuation-in-part of application No. 13/628,036, filed on Sep. 26, 2012, now Pat. No. 8,912,699.

(60) Provisional application No. 61/538,968, filed on Sep. 26, 2011.

(51) Int. Cl.
*H02K 53/00* (2006.01)

(52) U.S. Cl.
CPC .................. *H02K 53/00* (2013.01)

(58) Field of Classification Search
CPC ......... H02K 33/16; H02K 33/06; H02K 33/18
See application file for complete search history.

(56) References Cited

U.S. PATENT DOCUMENTS

| | | | |
|---|---|---|---|
| 1,957,281 A * | 5/1934 | Neureuther | H02K 19/06 310/163 |
| 3,992,641 A * | 11/1976 | Heinrich | H02K 19/103 310/114 |
| 4,151,431 A | 4/1979 | Johnson | |
| 4,577,126 A * | 3/1986 | Mailfert | H02K 55/02 310/114 |
| 4,751,486 A | 6/1988 | Minato | |
| 4,877,983 A | 10/1989 | Johnson | |
| 5,594,289 A | 1/1997 | Minato | |
| 5,789,837 A * | 8/1998 | Shin | F16C 32/0438 310/114 |
| 6,700,272 B1 | 3/2004 | Lindner | |
| 6,949,855 B2 | 9/2005 | Dubois et al. | |
| 8,876,386 B2 * | 11/2014 | Hibi | F16C 17/02 310/90 |
| 2005/0040720 A1 | 2/2005 | Dubois et al. | |
| 2006/0091755 A1 | 5/2006 | Carlisle | |
| 2007/0120426 A1 | 5/2007 | Oiwa et al. | |

(Continued)

FOREIGN PATENT DOCUMENTS

WO    WO2006045333    5/2006

*Primary Examiner* — Dang Le
(74) *Attorney, Agent, or Firm* — Thomas P. O'Connell; O'Connell Law Firm (57) ABSTRACT

A field gradient motor with a stator solenoid coil, a stator solenoid coil retained by a stator solenoid coil housing, a shaft rotatably retained in proximity to the stator solenoid coil, and a rotor retained relative to the shaft. The rotor has a plurality of iron disks retained by the shaft, and the stator solenoid coil, the plurality of iron disks, and the shaft cooperate to produce an axial closed toroidal B-field in a surrounding volume of air and an electromagnetic action of the motor. Radial notches with 45 degree equilateral triangular cross sections communicate radially on first and second faces of each disk. Where the notches are 360/N degrees wide, they can be 360/N degrees deep.

18 Claims, 6 Drawing Sheets

(56) References Cited

U.S. PATENT DOCUMENTS

2007/0176505 A1 8/2007 Trzynadlowski et al.
2008/0018194 A1 1/2008 Kakugawa et al.

* cited by examiner

DC FIELD GRADIENT MOTOR

RELATED APPLICATIONS

The present application is a Continuation-in-Part of application Ser. No. 13/628,036, filed Sep. 26, 2012, which claimed priority to Provisional Application No. 61/538,968, filed Sep. 26, 2011. The entirety of each disclosure is hereby incorporated by reference.

FIELD OF THE INVENTION

The present invention relates to electric motors. More particularly, disclosed and protected herein is a field gradient motor with a toroidal flux path shape.

BACKGROUND OF THE INVENTION

Magnetic motors with angled surfaces on magnets in the air gap have been patented by, among others, Howard Johnson with U.S. Pat. Nos. 4,151,431 and 4,877,983, Kohei Minato with U.S. Pat. Nos. 4,751,486 and 5,594,289, and Mike Brady with patent publication number WO2006045333A1. The motor disclosed herein represents an improvement over these and similar prior art disclosures by introducing a stator solenoid coil to replace the tilted field shaping magnets of the stator and closing the magnetic field path through the rotor core. The stator annular solenoid winding permits the all-important torque and speed control to match the shaft load requirements.

SUMMARY OF THE INVENTION

In one presently contemplated embodiment, the field gradient motor is founded on a direct current motor with an iron stator that has an axial magnetic field path from end to end and allows the return of the field inside through an iron rotor. The two ends of the stator are iron disks that allow the magnetic field to become radial at the surfaces of each of two cylindrical motor air gaps. The ends of the rotor also comprise discs that allow the magnetic field to be radial at the two motor air gaps. The cylindrical iron rotor then returns the magnetic field from one air gap of a stator ring, along its core axis, to the other air gap of the next stator ring, to close the magnetic field path of the motor upon itself. The central rotor diameter is thus smaller than its gap diameter.

The dimensional design objective is to keep the local cross sections of the magnetic field flux path about the same thereby to keep the field strength constant along its path. The length of each air gap is then one quarter of the central rotor diameter. The open axial space between the pair of end discs and the radial space between the inner diameter of the stator and the center rotor diameter has the shape of a ring. It is used to house the DC solenoid winding, which can create a constant single toroidal magnetic flux field of the motor. The radial B-field direction in one motor air gap is thus reversed in the opposite air gap. The solenoid direct current is constant during constant load torque operation at the motor shaft. Variable speed control and variable torque operation are obtained with feedback control of the electrical driver for the solenoid coil winding with a speed sensor comparator.

The DC motor as described above needs design features at the gap surfaces that produce the tangential force required for motor action. Therefore, the cylindrical surfaces of the rotor disks carry ridges at the gaps that are aligned in the axial direction and that have a saw tooth cross-section around the disk perimeter. The optimum condition for operation is approached when the B-fields in the saw teeth are tangential and thus about perpendicular to the motor toroidal field that crosses the gap. This can be best achieved with strong magnetically polarized permanent magnets, such as those made of NdFeBo compounds. The resulting B-field gradients in the gap are responsible for multi-directional vector forces with tangential force components, which create the integral rotor torque. Herein, these motors are referred to as Field Gradient Motors.

As disclosed herein, field gradient motors produce an axially symmetric three-dimensional magnetic flux loop of a single toroidal shape that is co-linear with the axis of rotation of the motor and passes through the cylindrical stator backwards to close the flux loop. The B-field flux loop has no harmonically or otherwise time-varying magnetic field reversals, although it is recognized that small superposed local field ripples on top of the nominally constant flux in the iron exist. More flux loops can be added in the axial direction, and more flux loops can be stacked in the radial direction.

Both mutually opposite field polarity B-fields in the stator-rotor air gap ring pairs can be attractive. Both mutually opposite field polarity B-fields in the stator-rotor air gap ring pairs can be repulsive. Continuous circumferential magnetic pole or poles as above can have magnetic flux that traverses laminated ferromagnetic materials, and that flux can be induced only by coil windings or maintained only by permanent magnets and can be variably speed and torque controlled.

The field gradient motor can be employed to generate mechanical power and can be employed in generating motional energy modes, whether stationary or portable and mobile. The motor can form a component of a motor-generator combination. Still further, an additional coil or coils can be employed for windings as in a step transformer.

Linear or rotational shaft power can be output where magnetic north and south pull or push together or in unison push-push and pull-pull in gap pairs with the field gradient between the poles having a force vector component tangential to the pole surface.

The magnetic flux path can be split using two separate rotors. More than one winding can be used on the stator to distribute the generation of the axial magnetic field around 360 degrees of the stator or less than 360 degrees.

It is possible still further to apply the field gradient motor to nanotechnology where the rotor and stator could be one or more atoms in width. The field gradient motor can permit use of focused gradient energy, and the magnetic or motive force can be used for a battery bank to store power and to make power, heat, or torque. Any form of motor bearings or magnetic bearings can be exploited, and any form of electrostatic field gradients and magnetic field gradients can be combined for an electromotive force.

One, two, or more complete 360-degree circumferential rotor and stator single pole air gaps can be used with magnets for torque or without magnets for field crossing only. Still further, two rotor and stator single pole gaps with less than 360 degrees of single pole arcs can be employed for control of RPM in an AC motor.

The invention can be carried forth in motors not requiring a commutator and in a servomotor, pancake motor, tube motor, regular motor, actuator, linear motor, inside-out motor, ring motor to drive fluids, bearing motor, stepper motor, nanotechnology motor, and other types of motor. The field gradient motor can also be operated with pulse width modulated DC and diode or SCR rectified AC. The field gradient motor can also alternatively be designed with permanent magnets in the rotor core and in the stator to create a variety of enhancements.

The field gradient motor of the parent application represented an improvement in the art. In the present application, one or more further design configurations of the motor are introduced. It will be recognized that the motor gaps are rendered radial instead of axial and where the the axial part of the steady magnetic field is used to cross the air gaps instead of the radial fields at the end iron disks of the first motor. Further analysis found that the saw tooth notches can be iron and still produce tangential force components as the permanent magnets are capable of producing.

This material design changes set forth herein, therefore, continue to exploit the basic operation of the DC Field Gradient Motor. The disclosed configurations make the motor more versatile. The disclosed construction allows the use of a large number of disks on the rotor shaft. With this, the gap area can be substantially increased as can be the motor capacity for torque.

A further new design configuration involves the elimination of the heavy iron stator housing and stator and motor rings and allowing the magnetic field to return in toroidal fashion to the iron multidisk rotor through the surrounding air. The benefits include lower weight, higher magnetic field strengths, and larger solenoid coil winding space for lower electric power loss. The elimination of the iron stator end rings also can also eliminate the need for permanent magnets to prevent brake lock to the rotor since the B-field is now axial. Eliminating the permanent magnets on the rotor disks lowers manufacturing costs and makes this motor configuration permanent magnet free.

In one practice of the disclosed invention, the field gradient motor can have a stator solenoid coil, a stator solenoid coil housing, a shaft rotatably retained by the housing, and a rotor retained relative to the shaft. The rotor can comprise a plurality of iron disks retained by the shaft, and the stator solenoid coil, the plurality of iron disks comprising the rotor, and the shaft can cooperate to produce an axial closed toroidal B-field in a surrounding volume of air and an electromagnetic action of the motor.

Embodiments of the field gradient motor can have end bells and fastening members, such as bolts or tie rods, secured to the coil housing for mounting the coil housing.

It is further contemplated that the plurality of iron disks can have first and second faces with radial notches communicating radially on at least one and perhaps both of the faces of each disk. The radial notches can have triangular cross sections, such as right-angle triangular cross sections with one notch surface perpendicular to the disk face and a wide notch surface at an oblique angle, potentially 45 degrees or less, to the disk face. Still further, a quantity of N radial notches can be disposed on one face of the disk with each notch being 360/N degrees wide at the disk face from an outside diameter of the disk communicating radially inward, and the radial notches could be 360/N degrees deep at the outside diameter of the disk communicating radially inward.

The surfaces of the radial notches disposed at an oblique angle to the disk face of the oblique notches can be of a consistent orientation. With that, the field gradient motor will be uni-directional in rotation of the shaft. Moreover, uni-directional, continuous rotation of the shaft during operation of the motor can be obtained by a steady-state toroidal magnetic field surrounding the stator solenoid coil that traverses the rotor while creating steady local tangential field gradient force vector components in motion at the surfaces of the radial notches disposed at oblique angles to the disk face. The shaft can be uni-directional in rotation by steady field gradient forces without alternate polarity switching of magnetic fields in a succession of opposing magnetic poles as in a conventional motor stator or rotor.

Some or all of the plurality of iron disks can be separated from each other on the shaft by a nonferrous material that maintains a gap between at least a portion of the plurality of iron disks. Moreover, the axial closed toroidal B-field can traverse the plurality of iron disks in series, substantially perpendicular to the disk faces and can generate tangential force components for motor action.

The shaft can be nonferrous to optimize motor action, or ferrous to optimize axial reaction forces.

The disclosed field gradient motor can be used to carry forth a method for generating mechanical power by operation of the field gradient motor. Mechanical power can, for instance be generated through rotation of the shaft.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

Embodiments of the field gradient motor are illustrated by way of example and not limitation in the following figures.

DETAILED DESCRIPTION OF PREFERRED EMBODIMENTS

The field gradient motor disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures. Therefore, before any particular embodiment of the invention is explained in detail, it must be made clear that the following details of construction and illustrations of inventive concepts are mere examples of the many possible manifestations of the invention.

The embodiment detailed here is a direct current (DC) electric motor that does not use pole polarity switching commutators or brushless alternating pulse width modulated power electronics of known prior art DC motors. In the field gradient motor, DC current is applied to the stator solenoid to set up a single, axially symmetric closed loop flux path through the stator and that returns through the rotor. The flux path shape is thus toroidal. The flux path shape has ideally constant area cross-sections perpendicular to the B-field flux lines to minimize local B-field field strength variations in the iron path.

Local B-field variations in the air gaps however are needed to obtain motor shaft torque. None of the cylindrical stator and rotor gap magnetic material surfaces are divided into magnetic poles of alternating North and South magnetic field polarity in the 360 degree circumferential direction, but are typically a continuous single pole ring surface spanning 360 degrees. Pole polarity only differs between complete motor air gaps at adjacent gap locations at the end disks for stator and rotor. An S-stator pole facing a N-rotor pole at one of the gaps thus is of the opposite polarity of its other N-stator/S-rotor gap. The cylindrical gap surfaces of the stator disks are smooth and may have a radially magnetized permanent magnet with a radial thickness into the stator that is sufficient to prevent magnetic clutch type brake action. If not implemented, the field gradients of the rotor saw teeth can induce locking B-field variations in the stator iron that reduce torque creation.

Principle of operation. Volumetric Energy Density, energy per unit volume, is dimensionally equivalent to Pressure. This follows from considering the dimensions of energy density as determined by "length×force/volume units". By dividing numerator and denominator by unit length, this is simplified to "force/area" and can be quantified as psi, millibar, pascal, kg/square cm, and other energy density dimensions. The energy density of a fluid medium is hereby shown to be the same as the pressure of the fluid medium. This applies to all energy fields, such as the energy density of the cosmos expressed as Einstein's Cosmological Constant and gravitational, electrostatic, and magnetic fields.

When the magnetic field energy locally diverges or converges, and thereby changes, there are energy density changes that are then pressure differentials or gradient vectors acting on an area perpendicular to the vector direction. The product of this actually becomes the operational force since ("force/area")×"area"="force" associated with the local "field gradient".

Figure 3:
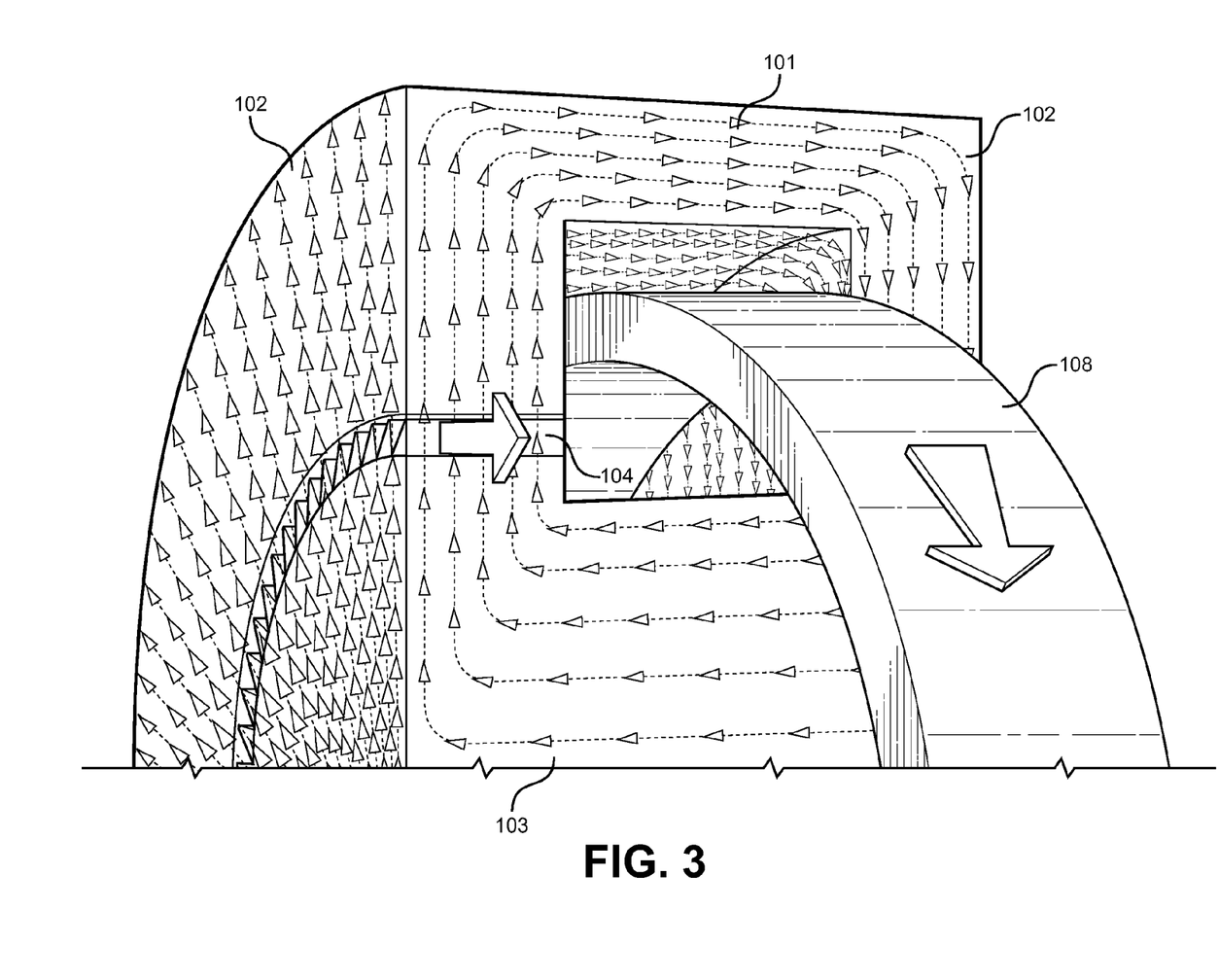
FIG. 3 is a schematic depiction of the axial magnetic field of the field gradient motor with velocity and force vectors.
Figure 4:
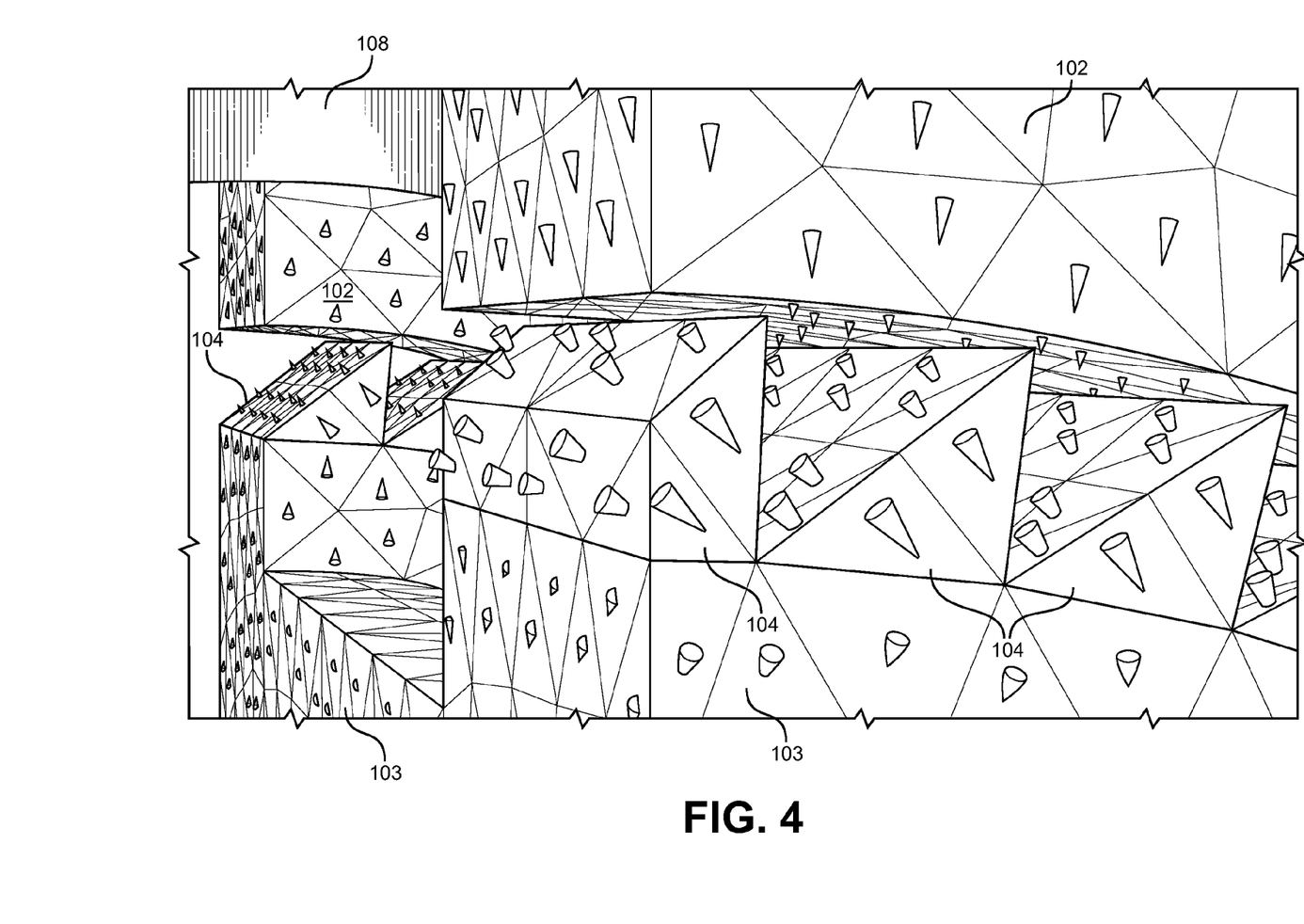
FIG. 4 is a magnified view of the permanent magnets with toroidal B-field vector arrows, coil current vectors, and force/velocity vectors schematically depicted.

The disclosed motor, therefore, generates forces by creating field gradients in the magnetic field in the air gap between the stator and the rotor of the motor and extending for a short distance beyond the gap surfaces of the stator and the rotor into the magnetic materials. The use of saw tooth shapes, as on a radial saw blade, for the motor's rotor end discs cross-section profile shapes the field gradients in such a way that the resulting forces between the rotor and the stator have meaningful vector components tangent at the rotor surface. The shapes and the resulting vector components are thus responsible for torque that rotates the rotor to produce power with the coil applied magnetic field. FIG. 3 provides a schematic depiction of the axial magnetic field achieved by the field gradient motor 100 with velocity and force vectors as illustrated, and FIG. 4 is a magnified view of the permanent magnets 104 with toroidal B-field vector arrows, coil current vectors, and force/velocity vectors schematically depicted.

The energy density in air of a nearly saturated iron magnetic flux path of 15,000 Gauss (1.5 Tesla) is about 130 psi. Since the tangent vector is a fraction of the gap vector, it is projected that here a constant 5 psi tangent field gradient as a differential energy density change can be achieved. Design optimization attempts to approach this goal and maximize the derived tangent force vector of this field gradient, which is expected to be substantially larger than the typical root mean square (RMS) value of 1.7 psi for industrial 60 Hertz 3-phase induction motors. The peak value for 1.7 psi RMS is 1.7×(square root of 2)=2.4 psi.

Figure 1:
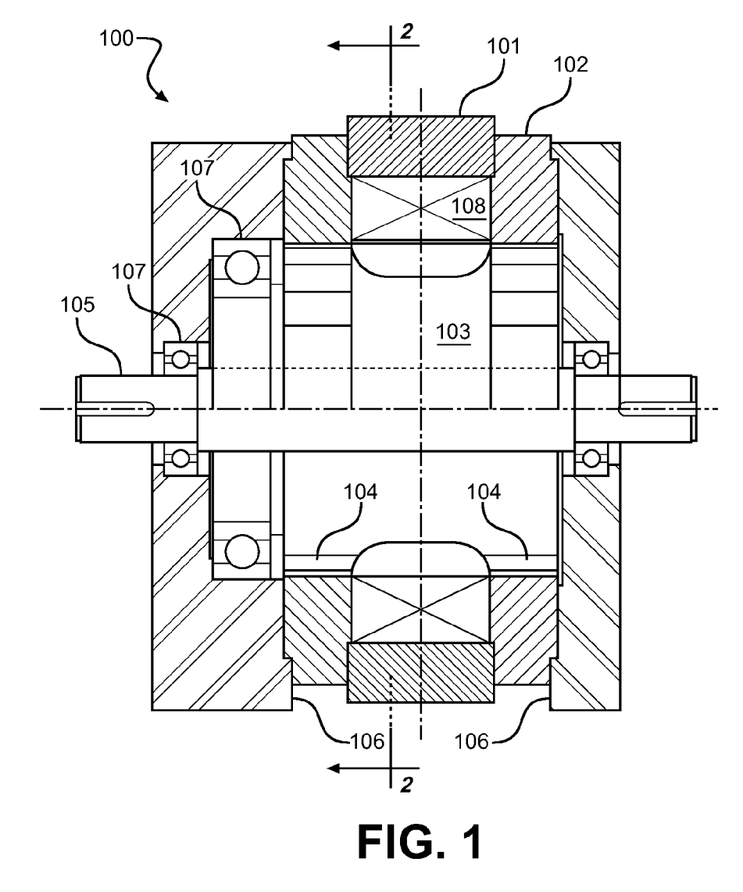
FIG. 1 is an axial cross section of a field gradient motor as disclosed herein.
Figure 2:
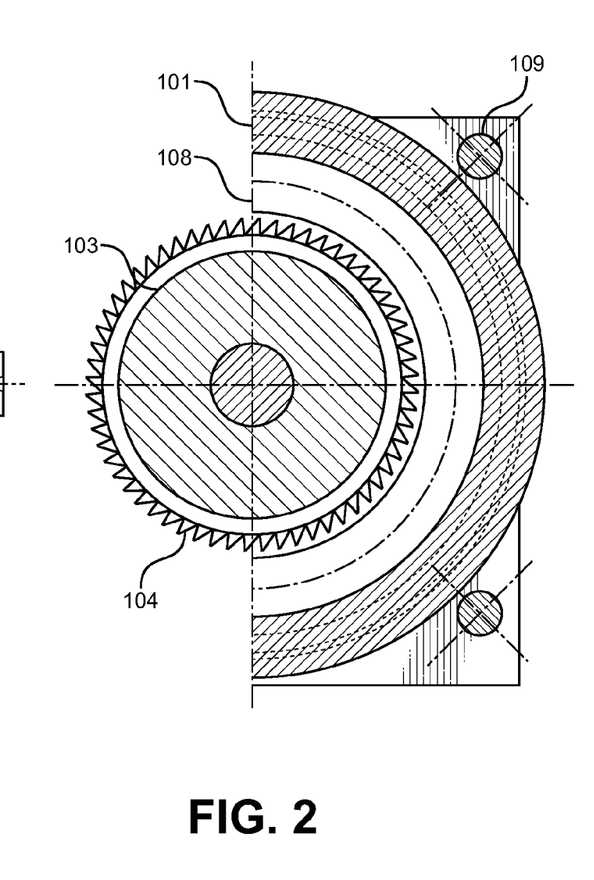
FIG. 2 is a cross section of the field gradient motor taken along the line A-A in FIG. 1 to provide a mid-plane cross-sectional view.

Referring to FIG. 1, a Field Gradient Motor Assembly is indicated generally at 100 and has a stator housing 101, an iron ring of 1010 or 1018 steel with sufficient radial thickness to pass the axial magnetic field flux at below saturation level, such as not to exceed 1.5 Tesla. The two stator disks 102 are also 1010 or 1018 steel or equivalent and serve to turn the B-field flux lines 90 degrees towards the motor air gap. A rotor 103 is also of 1010 or 1018 steel and has a hole and keyway feature to introduce a nonferrous hole and keyway through shaft 105. The rotor ends are of larger diameter than the rotor core and less than the air gap diameter to leave space for the permanent magnets 104 on the rotor 103. Nonferrous end bells 106, bearings 107, and tie rods 109 serve to mount the stator housing 101 and stator disks 102 on a motor load base and extract rotary power from the Field Gradient Motor 100.

The cylindrical rotor gap ends have an axial length that is designed to give the radially turned B-field a strength of 1.5 Tesla. The permanent magnets 104 on the rotor 103 placed around the two rotor ends can be 45 degree equilateral triangles in cross section. The permanent magnets 104 are bonded with a short side to the cylindrical rotor ends and their long side in the axial direction. The magnets 104 are all tangentially magnetized clockwise in one of the gaps and counter-clockwise in the next gap. The stator housing 101, the stator disks 102, the rotor 103, the permanent magnets 104, and the shaft 105 cooperate with a coil 108 produce the electromagnetic action of the motor. As noted previously, a schematic depiction of the axial magnetic field achieved by the field gradient motor 100 with velocity and force vectors is illustrated in FIG. 3, and the permanent magnets 104 with toroidal B-field vector arrows, coil current vectors, and force/velocity vectors are schematically depicted in FIG. 4.

A field gradient motor 100 is preferably put into operation by applying DC from any DC source, including PWM DC, to the single solenoid 108 in the stator housing and disks 101 and 102. The operational speed of the rotor 103 is determined by the stator input current and the torque/speed curve of the load that is coupled to its output shaft 105. A higher torque at the same or higher speed can be supplied by the field gradient motor 100 by increasing the input current. A variable load torque at the same speed can be handled by the electric power driver of the motor 100 with a matched servo-feedback control loop using a motor speed sensor comparitor.

The field gradient motor 100 can also be operated with high frequency pulse width modulated (PWM) DC, and diode or SCR rectified AC. Reversal of the DC current in the stator housing and disks 101 and 102 is not recommended because of potential damage to the stator permanent magnets 104 at the gap, but it is still possible to a limited degree. The torque capacity after limited reversing of the solenoid drive current and the following retarded reversal of the rotor speed is expected to be lower as a result of lesser torque at the same stator current.

This field gradient motor 100 has the advantage, that, without the magnetic field switching of the magnetic poles of conventional DC motors, the losses of eddy currents, magnetic hysteresis, and counter EMF are reduced. Therefore, energy savings with the use of field gradient motors 100 are guaranteed.

Figure 5A:
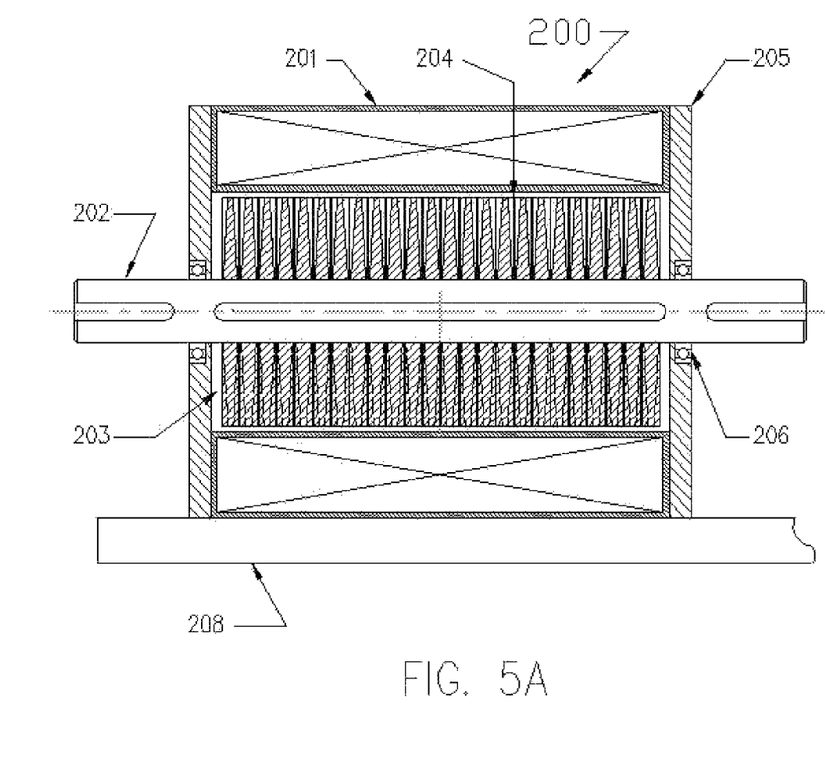
FIG. 5A is an axial cross section of an alternative field gradient motor pursuant to the invention.
Figure 5B:
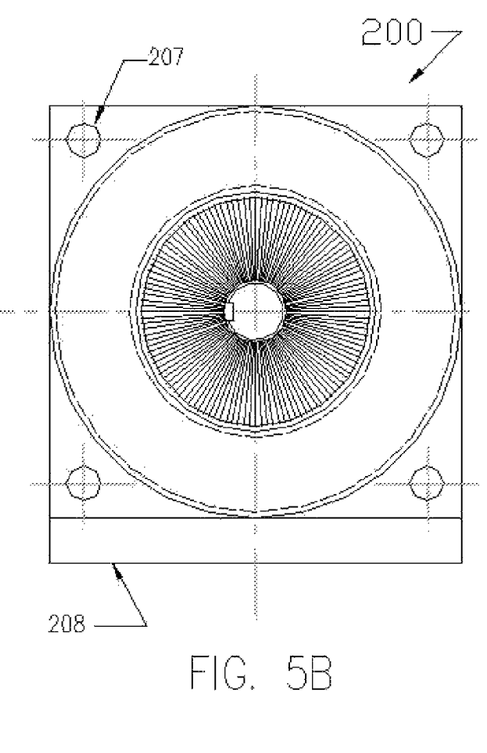
FIG. 5B is a radial cross section of the field gradient motor of FIG. 5A.

A further embodiment of the invention is depicted in FIGS. 5A and 5B in the form of a DC field gradient motor, which is indicated generally at 200. The DC field gradient motor 200 has a stator solenoid coil 201 wound on a bobbin in an enclosure or housing. A rotor shaft 202 is rotatably retained. The rotor shaft 2020 retains a plurality of grooved iron disks 203 that are keyed to the rotor shaft 202. Disk gap spacers 204, which are in the same number minus one of the disks 203, are interposed between the radially distal portions of the disks 203. Supportive end bells 205 are rotatably support the shaft 202, potentially with bearings 206. With additional reference to FIG. 5B, the motor 200 can additionally incorporate fastening members, such as bolts or tie rods 207, and a motor loading baseplate 208. A further DC field gradient motor 100 is shown in FIGS. 6A and 6B where the motor 100 has iron flux return.

Figure 6A:
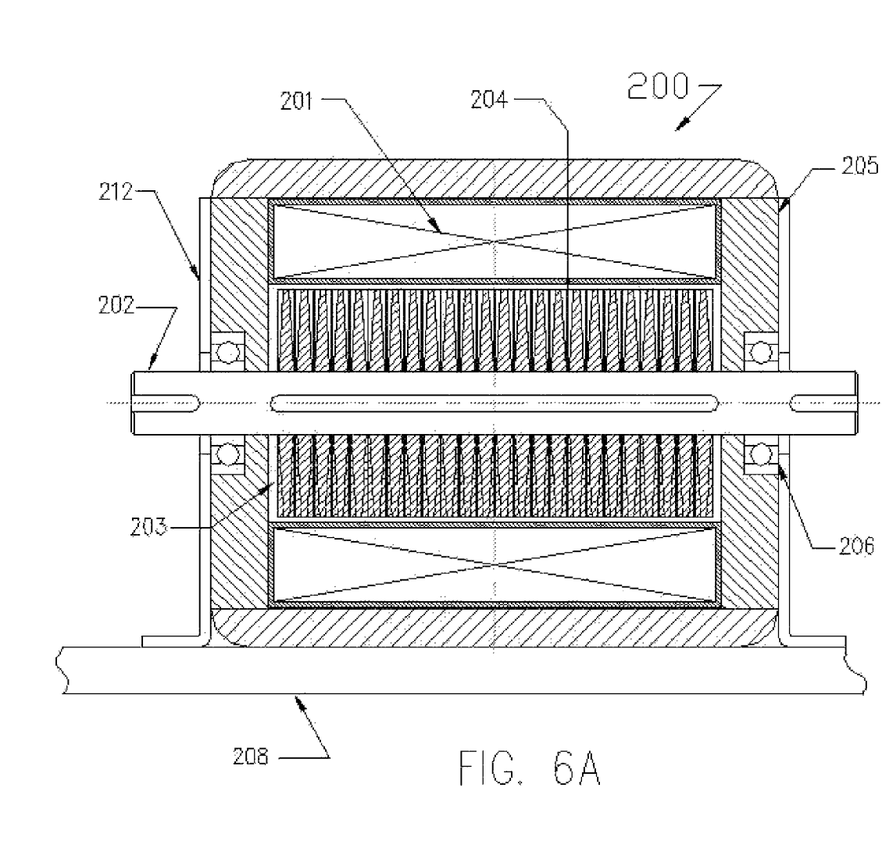
FIG. 6A is an axial cross section of another alternative field gradient motor as disclosed herein.
Figure 6B:
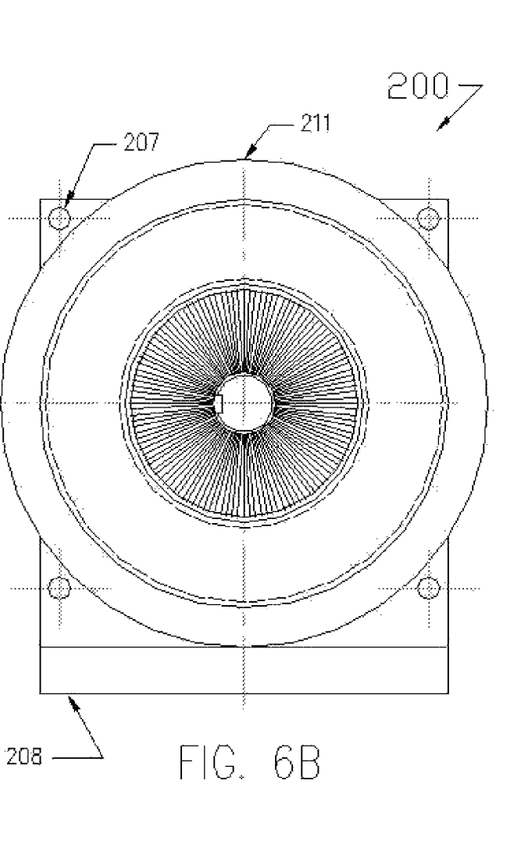
FIG. 6B is a radial cross section of the field gradient motor of FIG. 6A.

The motor 200 can further incorporate tie rods 207 and a motor loading base plate 208 as seen, for example, in FIGS. 6A and 6B. Brackets 212 can secure the end bells 205 to the base plate 208. Moreover, motors 200 as disclosed herein can include a torroidal housing 211 that can envelop, for example, some or all of the coil 201, shaft 202, and rotor disks 203.

Figure 7A:
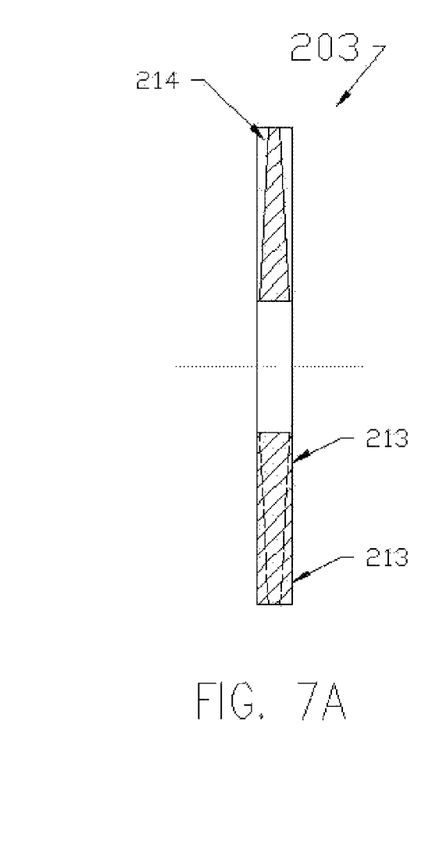
FIG. 7A is an axial cross section of a disk according to the invention.
Figure 7B:
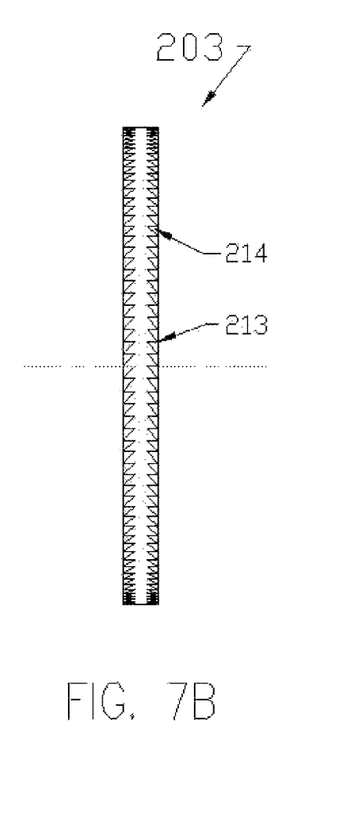
FIG. 7B is a view in side elevation of the disk of FIG. 7A.
Figure 7C:
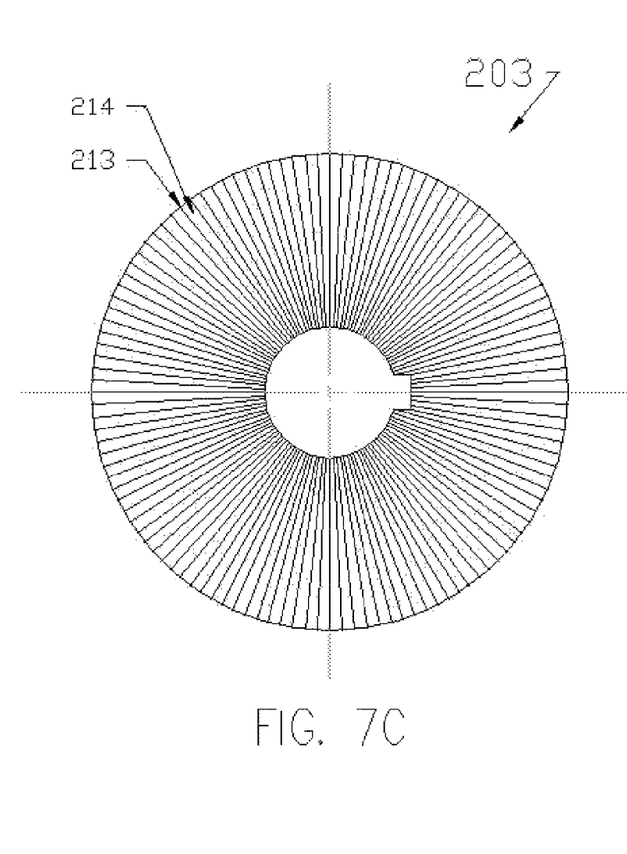
FIG. 7C is a view in front elevation of the disk of FIG. 7A

A rotor disk 203 for the motors 200 of FIGS. 5A through 6B is illustrated in FIGS. 7A through 7C. The depicted rotor disk 203 is shown to have radially communicating saw-tooth shaped teeth 213 evenly spaced in mirror mirror symmetry on each surface of the rotor disk 203.

A motor 200 with a single winding coil stator 201 has an external axial toroidal magnetic field path from end to end and allows the return of the field inside through the multiple iron rotor disks 203 instead of the solid iron rotor 103 described above. All rotor disks 203 can be keyed to a single steel, stainless steel or low electrical resistivity metal rotor shaft 202 with end bearings 206 and current slip rings 210.

The motor action is now produced by a radial saw tooth shaped edge on either or both faces of the rotor disks 203 and an axial magnetic field instead of the axially directed saw tooth shaped edge and radial magnetic field previously described. As best seen perhaps in FIG. 8B, the saw tooth shaped edge is defined by radially disposed, triangular teeth or ridges 213 with interposed radially disposed, triangular grooves 214. Adjacent disks 203 are separated by disk gap spacers 204, which could be air gaps or thin electrical insulator sheets that could be of the same diameter. The rotor disks 203 are thick enough to have radially disposed grooves 213 disposed to both surfaces of the disks 203. The ridges 213 and interposed grooves 214 travel from near the shaft 202 radially out through the outer cylindrical diameter gap interface. The ridges 213 and grooves 214 are of a constant angular spacing, such as for example with three degrees between grooves 214 thus allowing 120 grooves over a full 360 degree circle.

One side of each triangular ridge 213 is perpendicular to the surfaces of the disk 203. A second side of each tooth or ridge 213 is sloped at an angle, 45 degrees in this example. The grooves 214 can be cut with a single 45-degree angle dovetail cutter to create a saw tooth appearance at the disk rim end of the ridges 213 and grooves 214. The sharp edge between any two grooves 214 at the surface of the disk 203 are at the original flat surface to maintain the constant air gap. The teeth 213 can have equilateral triangular cross sections so that the height of the saw tooth shape so established can also be 3 degrees in the radial direction along the sharp edge at the surface of the disk 203.

The depicted configuration produces B-field gradients in the gaps that are responsible for multi-directional vector forces with tangential force vector components that create the integral rotor torque when the axial magnetic field traverses the radial sharp edge disk gaps. This is similar to the radial magnetic fields in the axial cylindrical gaps of the motor 100 previously shown and described.

In FIGS. 5A and 5B, an embodiment of the DC field gradient motor 200 is shown without the heavy cross sections of the stator 201 and the rotor disks 203 and stator rings. One advantage is an increase of magnetic field strength through air that is not so much limited by the magnetic field saturation of iron near 20 kGauss (2 Tesla). This design approach also eliminates the use of permanent magnets because of their low specific magnetic susceptibility in the many stacked rotor disks 203. The iron disks 203 will still develop the tangential force components although at higher field strengths and can outperform the permanent magnets. Computer analysis shows a resultant axial force component of which practices of the invention can take advantage. FIGS. 6A and 6B show the rotor disk configuration of the present invention with the proper iron cross section return for the B-field below saturation and near 1.5 Tesla, rather than the typical 4 Tesla for the toroidal air path of the B-field.

The method of use of the DC field gradient motor 200 can be similar to that described above. Also, the motor 200 can be uni-directional and not reversible in rotor direction. This uni-directional functionality can be determined by the tangential direction of the ridges 213 and grooves 214 in all disks 203 being of the same orientation.

The energy savings advantage of the motor 200 is improved since higher torque capability can be achieved by the larger gap area obtained by using a large number of disks 203 on the motor shaft 202 while the coil volume is also larger. With that, the same magnetic field strength can be produced at reduced coil impedance and electric power loss.

With certain details and embodiments of the field gradient motor 100 and DC field gradient motor 200 according to the present invention disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

We claim:

1. A field gradient motor comprising:
   a stator solenoid coil;
   a shaft rotatably retained in proximity to the stator solenoid coil;
   a rotor retained relative to the shaft wherein the rotor comprises at least one iron disk retained by the shaft wherein the at least one iron disk has a central aperture and an outer periphery;
   wherein the stator solenoid coil, the at least one iron disk comprising the rotor, and the shaft cooperate to produce an axial closed toroidal B-field in a surrounding volume of air and an electromagnetic action of the motor;
   wherein the at least one iron disk has first and second faces, wherein the at least one iron disk has radial ridges that communicate radially on the first face, wherein the at least one iron disk has radial grooves interposed between the radial ridges, and wherein the radial ridges and radial grooves communicate radially from adjacent to the central aperture of the at least one disk to adjacent to the outer periphery of the at least one disk;
   wherein the radial ridges have triangular cross sections and wherein the triangular cross sections of the radial ridges have one ridge surface perpendicular to the disk face and a ridge surface at an oblique angle to the disk face.

2. The field gradient motor of claim 1 further comprising a stator solenoid coil housing wherein the stator solenoid coil and the shaft are retained by the stator solenoid coil housing.

3. The field gradient motor of claim 2 further comprising end bells and fastening members secured to the coil housing for mounting the coil housing.

4. The field gradient motor of claim 1 wherein radial ridges are disposed on the first and second faces of the at least one iron disk.

5. The field gradient motor of claim 1 wherein the triangular cross sections of the radial ridges have a ridge surface at an angle of approximately 45 degrees or less to the disk face.

6. The field gradient motor of claim 5 wherein the radial ridges have 45-degree equilateral triangular cross sections.

7. The field gradient motor of claim 1 wherein the rotor comprises a plurality of iron disks retained by the shaft and wherein the surfaces disposed at an oblique angle to the disk face of the oblique ridges are of a consistent orientation whereby the field gradient motor is uni-directional in rotation of the shaft.

8. The field gradient motor of claim 7 wherein uni-directional, continuous rotation of the shaft during operation of the motor is obtained by a steady-state toroidal magnetic field surrounding the stator solenoid coil that traverses the rotor while creating steady local tangential field gradient force vector components in motion at the surfaces of the radial ridges disposed at oblique angles to the disk face.

9. The field gradient motor of claim 1 wherein a quantity of N radial notches ridges is disposed on one face of the disk is 360/N degrees wide at the disk face from an outside diameter of the disk and communicating radially inward and wherein the radial ridges are 360/N degrees deep at the outside diameter of the disk and communicating radially inward.

10. The field gradient motor of claim 1 wherein the rotor comprises a plurality of iron disks retained by the shaft and wherein the plurality of iron disks are separated from each other on the shaft by a nonferrous material that maintains a gap between at least a portion of the plurality of iron disks.

11. The field gradient motor of claim 1 wherein the rotor comprises a plurality of iron disks retained by the shaft and wherein the plurality of iron disks have first and second faces and wherein the axial closed toroidal B-field traverses the plurality of iron disks in series, substantially perpendicular to the disk faces generates tangential force components for motor action.

12. The field gradient motor of claim 1 wherein the shaft is nonferrous to optimize motor action.

13. The field gradient motor of claim 1 wherein the shaft is ferrous to optimize axial reaction forces.

14. The field gradient motor of claim 1 wherein the stator solenoid coil operates as a superconductor.

15. The field gradient motor of claim 1 wherein an input electric power for the stator solenoid coils has steady or pulsed direct current.

16. The field gradient motor of claim 1 wherein the motor does not use a pole polarity switching commutator or brushless alternating pulse width modulated power electronics.

17. The field gradient motor of claim 1 wherein the shaft is uni-directional in rotation by steady field gradient forces without alternate polarity switching of magnetic fields in a succession of opposing magnetic poles.

18. A method for generating mechanical power by operation of the field gradient motor of claim 1.

* * * * *